United States Patent
Yoshinaga et al.

(10) Patent No.: US 6,984,120 B2
(45) Date of Patent: *Jan. 10, 2006

(54) ELECTRIC DIRECT-ACTING DIE CLAMPING UNIT OF AN INJECTION MOLDING MACHINE

(75) Inventors: Akira Yoshinaga, Numazu (JP); Jun Koike, Shizuoka-ken (JP); Fumiyuki Kato, Shizuoka-ken (JP); Makoto Nishizawa, Numazu (JP)

(73) Assignee: Toshiba Machine Co., LTD, Tokyo (JP)

(*) Notice: Subject to any disclaimer, the term of this patent is extended or adjusted under 35 U.S.C. 154(b) by 183 days.

This patent is subject to a terminal disclaimer.

(21) Appl. No.: 10/122,222

(22) Filed: Apr. 16, 2002

(65) Prior Publication Data

US 2002/0164396 A1 Nov. 7, 2002

(30) Foreign Application Priority Data

May 7, 2001 (JP) .................................. 2001-136461

(51) Int. Cl.
*B29C 45/64* (2006.01)

(52) U.S. Cl. ............... 425/589; 425/451.7; 425/595
(58) Field of Classification Search ............. 425/589, 425/595, 451.7
See application file for complete search history.

(56) References Cited

U.S. PATENT DOCUMENTS

| 4,702,688 | A | * | 10/1987 | Schenk ................... 425/451.7 |
| 5,352,394 | A | * | 10/1994 | Fujita et al. ................ 425/589 |
| 6,254,371 | B1 | * | 7/2001 | McNally et al. ......... 425/451.7 |
| 6,270,333 | B1 | * | 8/2001 | Tamaki et al. .............. 425/595 |

FOREIGN PATENT DOCUMENTS

| DE | 298 21 379 | | 4/1998 |
| EP | 0 275 318 | | 7/1988 |
| JP | 64-45616 | * | 2/1989 |

* cited by examiner

*Primary Examiner*—James P. Mackey
(74) *Attorney, Agent, or Firm*—Pillsbury Winthrop Shaw Pittman LLP

(57) ABSTRACT

An object of the present invention is to suppress a clamping force from sharply increasing when dies are clamped in an electric direct-acting die clamping unit of an injection molding machine. A movable platen is arranged to face a stationary platen. A stationary die is attached to the front surface of the stationary platen, whereas a movable die is attached to the front surface of the movable platen. The movable platen is connected to the front surface of a backup plate via four coil springs. A nut of a ball screw is fixed at each of diagonally-opposed corners of the backup plate. The threaded rod of the ball screw passes through the backup plate via the nut. The tip portion of the threaded rod is rotatably connected to the stationary platen. The rear end portion of the threaded rod is connected to a motor.

2 Claims, 5 Drawing Sheets

ELECTRIC DIRECT-ACTING DIE CLAMPING UNIT OF AN INJECTION MOLDING MACHINE

CROSS-REFERENCE TO RELATED APPLICATIONS

This application is based upon and claims the benefit of priority from the prior Japanese Patent Application No. 2001-136461, filed May 7, 2001, the entire contents of which are incorporated herein by reference.

BACKGROUND OF THE INVENTION

1. Field of the Invention

The present invention relates to a die clamping unit of an injection-molding machine, and more specifically, to the structure of an electric direct-acting die clamping unit directly transmitting thrust from a driving source to a movable platen without using a toggle mechanism.

2. Description of the Related Art

FIG. 6 shows a schematic structure of a conventional electric direct-acting die clamping unit.

A stationary platen 3 and a back plate 62 are arranged at both ends of a base 1 so as to face each other. A movable platen 4 is arranged in the front of the back plate 62 so as to face the stationary platen 3. A stationary die 5 is attached to the front surface of the stationary platen 3, whereas a movable die 6 is attached to the front surface of the movable platen 4.

The back plate 62 and the stationary platen 3 are connected by four tie rods 67. A through-hole is formed at each of the four corners of the movable platen 4. The four tie rods 67 are passed through the corresponding through-holes. The movable platen 4 slidably moves back and forth along the tie rods 67, thereby clamping and unclamping the dies.

The movable platen 4 is connected to the front surface of the back plate 62 via a ball screw 70. More specifically, a load cell 75 is fixed to the back surface of the movable platen 4. The tip portion of the threaded rod 71 of the ball screw is fixed to the back surface of the load cell 75. The nut 72 of the ball screw is rotatably supported by the back plate 62 via a bearing 77.

A motor 80 is arranged under the base 1. A pulley 82 is attached to the end surface (at the side close to the movable die) of the nut 72. Another pulley 81 is attached to the shaft of the motor 80. A timing belt 83 goes around the two pulleys 81 and 82. When the motor 80 rotates the nut 72, the threaded rod 71 moves back and forth along its axis, thereby moving the movable platen 4 back and forth along the tie rods 67.

As mentioned above, in the conventional electric direct-acting die clamping unit, the movable platen 4 is moved by the ball screw 70 to clamp and unclamp the dies.

(A Problem of Conventional Direct-Acting Die Clamping Unit)

When the dies are clamped by the conventional direct-acting die clamping unit, the reaction force is received only by four tie rods 67. The tie rods 67 are rigid since the total sectional area of the tie rods is large. Therefore, even if the reaction force is applied to the tie rods, the tie rods do not stretch so much. Therefore, the die clamping force (i.e., compressive stress applied to the die surfaces) sharply increases immediately after the die surface of the stationary die 5 comes into contact with that of the movable die 6. As a result, the overshoot of the die clamping force occurs. Therefore, it becomes difficult to control the clamping force accurately.

Furthermore, since an excessively large load is applied to structural parts of the die-clamping unit, the life of parts are short.

BRIEF SUMMARY OF THE INVENTION

The present invention has been made in view of problems associated with the electric direct-acting die clamping unit of the conventional injection-molding machine. An object of the present invention is to provide an electric direct-acting die clamping unit capable of accurately controlling a die-clamping force by suppressing the die-clamping force from sharply increasing, thereby preventing the overshoot of the die-claming force.

According to the present invention, there is provided an electric direct-acting die clamping unit of an injection molding machine, comprising:

a stationary platen holding a stationary die;

a movable platen arranged to face the stationary platen and holding a movable die;

a backup plate arranged in the rearward of the movable platen;

an elastic member connecting between the movable platen and the backup plate and contractable in the direction along which a clamping force is applied;

a plurality of ball screws, which connects between the stationary platen and the backup plate; a tip of the threaded rod of each of the ball screws being rotatably connected to the stationary platen and the nut of each of the ball screws being fixed to the backup plate; and a motor rotating the threaded rods of the plurality of ball screws synchronously with each other.

Preferably, a coil spring is used as the elastic member.

Now, the operation of the electric direct-acting die clamping unit of the present invention will be explained.

A plurality of ball screws is synchronously moved to move the backup plate back and forth with respect to the stationary platen. Since the movable platen is connected to the front of the backup plate, the movable platen moves forward and backward together with the backup plate.

When dies are clamped, the movable platen is moved toward the stationary platen to bring the surfaces of both dies into contact with each other. At this time, the reactive force against to die clamping force (compressive stress applied to the die surfaces) is transmitted to the threaded rod of the ball screw via the elastic member and the backup plate. As a result, the threaded rod of the ball screw elastically stretches, whereas the elastic member deforms in the contraction direction.

The spring constant of the elastic member used herein is appropriately set to permit the elastic member to contract relatively more than the threaded rod stretches. By virtue of this, the die clamping force increases gently when the die surfaces are brought into contact with each other by clamping the dies. In this manner, the die clamping force can be controlled accurately.

As mentioned above, according to the electric direct-acting die clamping unit of the injection molding machine of the present invention, the overshoot of the die clamping force can be prevented, thereby controlling the application of the clamping force accurately.

DETAILED DESCRIPTION OF THE INVENTION (Embodiment 1)

Figure 1:
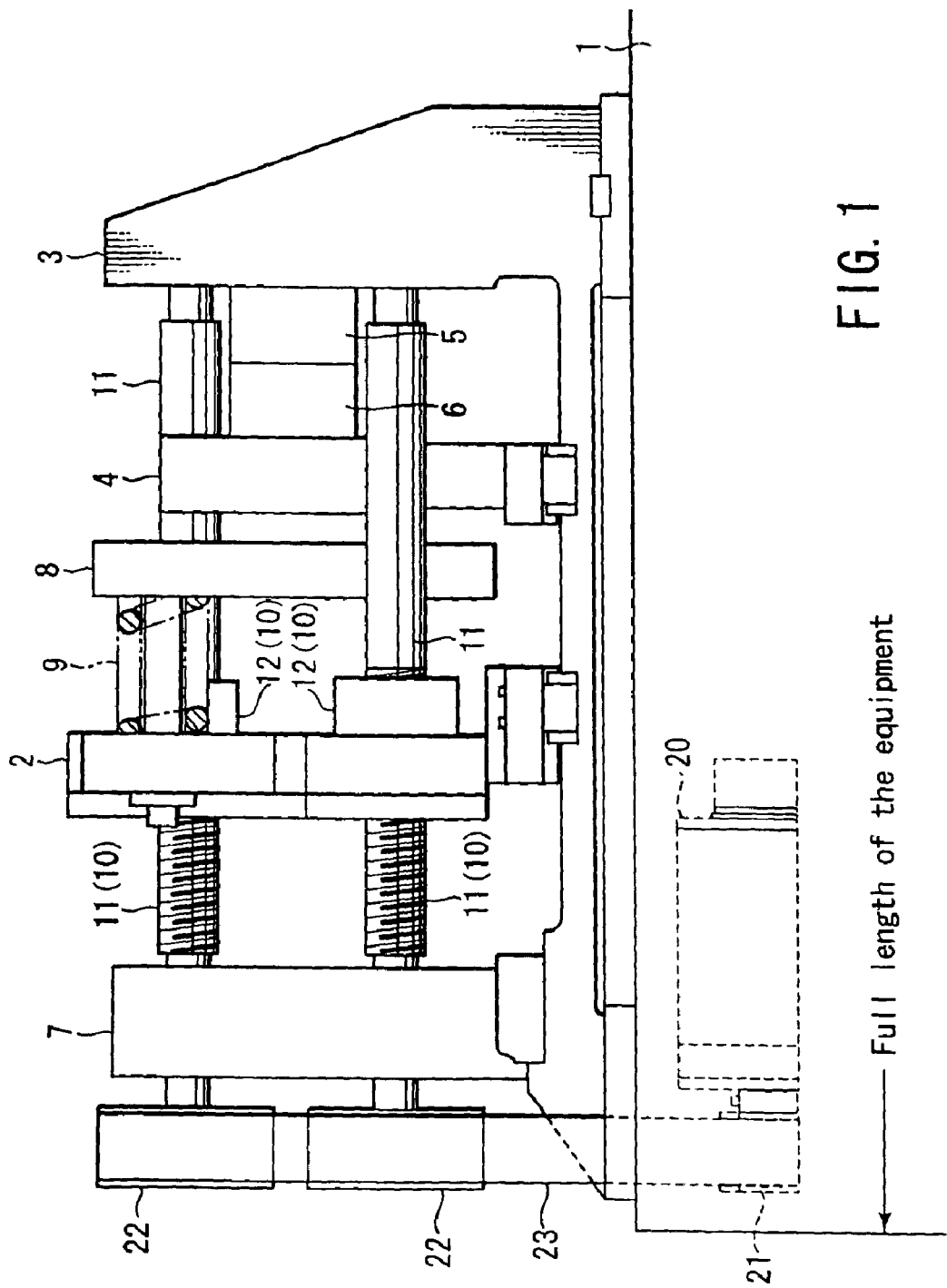
FIG. 1 is a front view showing a schematic structure of the electric direct-acting die clamping unit of the present invention.
Figure 2:
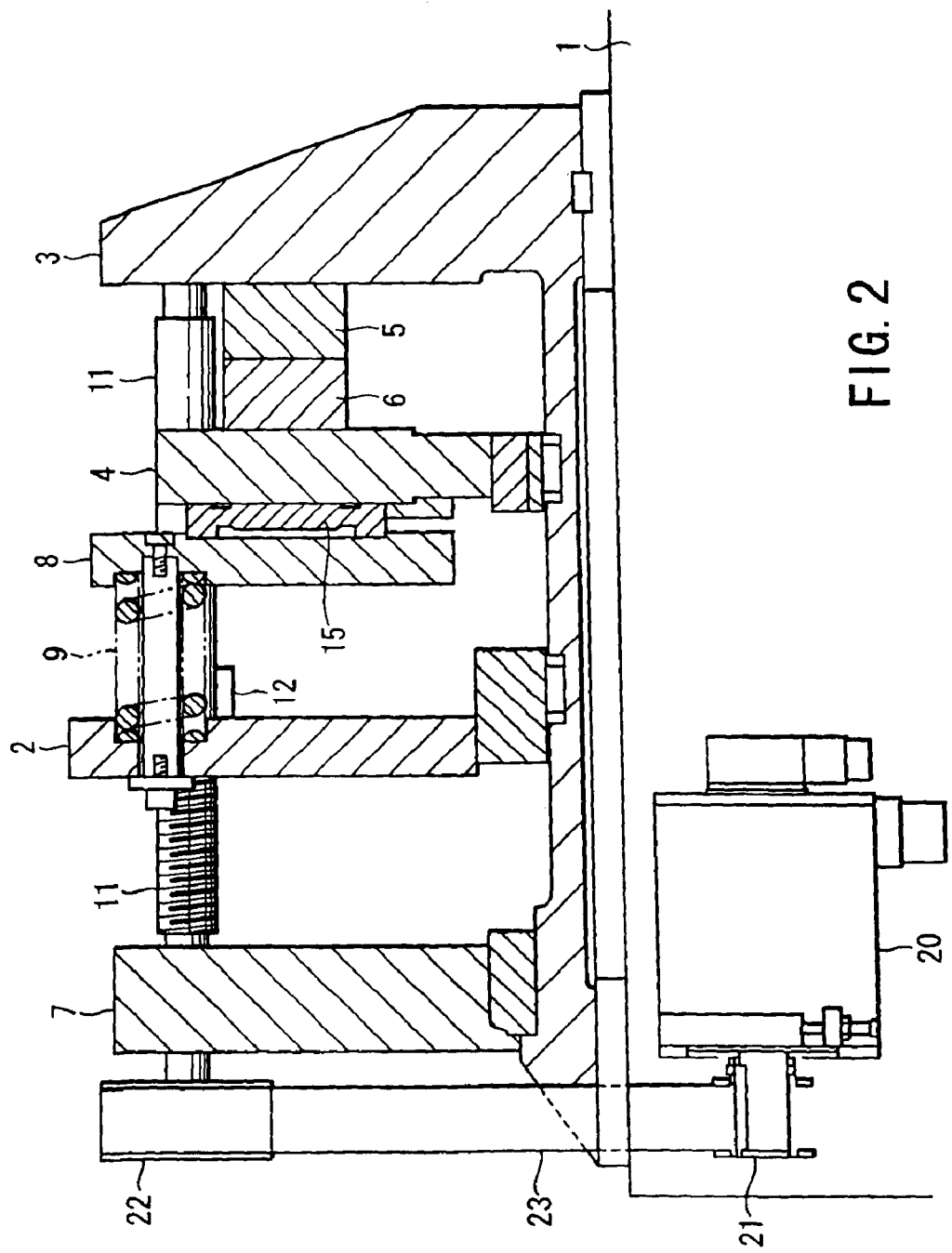
FIG. 2 is a sectional view showing the schematic structure of the electric direct-acting die clamping unit of the present invention, taken along the axis of the unit.

FIGS. 1 and 2 show a schematic structure of the electric direct-acting die clamping unit of an injection-molding machine according to the present invention. FIG. 1 is a front view of the unit and FIG. 2 is a cross sectional view of the unit taken along the axis of the unit. The unit shown in the figures has a stationary platen 3, a movable platen 4, a stationary die 5, a movable die 6, a backup plate 2, a coil spring 9 (elastic member), a ball screw 10, a threaded rod 11 of the ball screw, and a nut 12 of the ball screw.

The stationary platen 3 and a support plate 7 are arranged at both ends of a base 1, respectively, so as to face each other. The movable platen 4 is arranged in the front of the stationary platen 3 so as to face the stationary platen 3. The stationary die 5 is attached to the front surface of the stationary platen 3, whereas the movable die 6 is attached to the front surface of the movable platen 4. The movable platen 4 is designed to slide on the base 1.

The backup plate 2 is arranged between the support plate 7 and movable platen 4. The backup plate 2 is designed to slide on the base 1. The nut 12 of the ball screw is fixed at each of the two corners of the back plate 2 on the diagonal line. The threaded rod 11 of the ball screw 10 passes through the backup plate 2 via the nut 12. The tip portion (right end, in the figure) of the threaded rod 11 is rotatably connected to the stationary platen 3. On the other hand, the rear end (left end, in the figure) of the threaded rod 11 is rotatably supported by the support plate 7 and passes through the support plate 7. To the front surface of the backup plate 2, the movable platen 4 is connected via four coil springs 9.

A motor 20 is arranged under the base 1. A pulley 22 is attached to the rear end portion (left end, in the figure) of the threaded rod 11 of each of the ball screws. A pulley 21 is attached to the shaft of the motor 20. A timing belt 23 goes around the pulleys 21 and 21, as described later.

Figure 3:
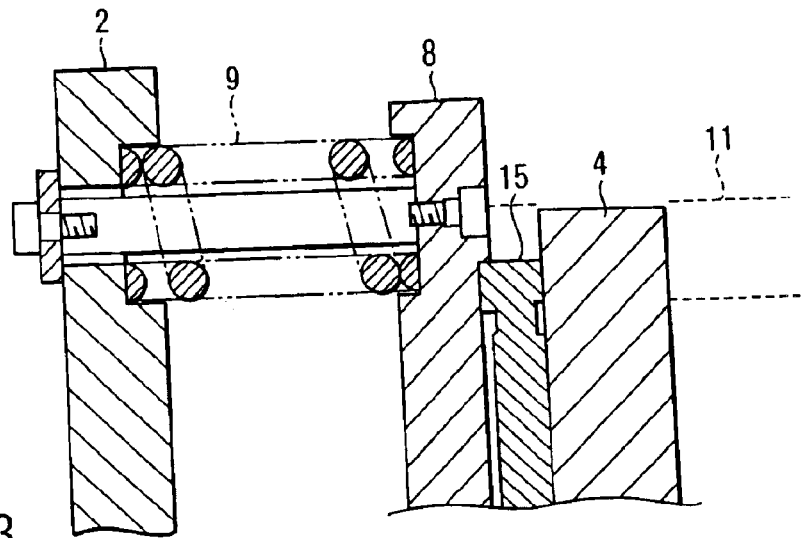
FIG. 3 is a detail view showing the connecting portion between the backup plate and the movable platen.

FIG. 3 shows the detail of the connecting portion between the backup plate 2 and movable platen 4. At the back surface of the movable platen 4, a spring support member 8 is attached via a load cell 15. The backup plate 2 is connected to the spring support member 8 by means of four coil springs 9 arranged in the vicinity of four sides of the backup plate 2.

Figure 4:
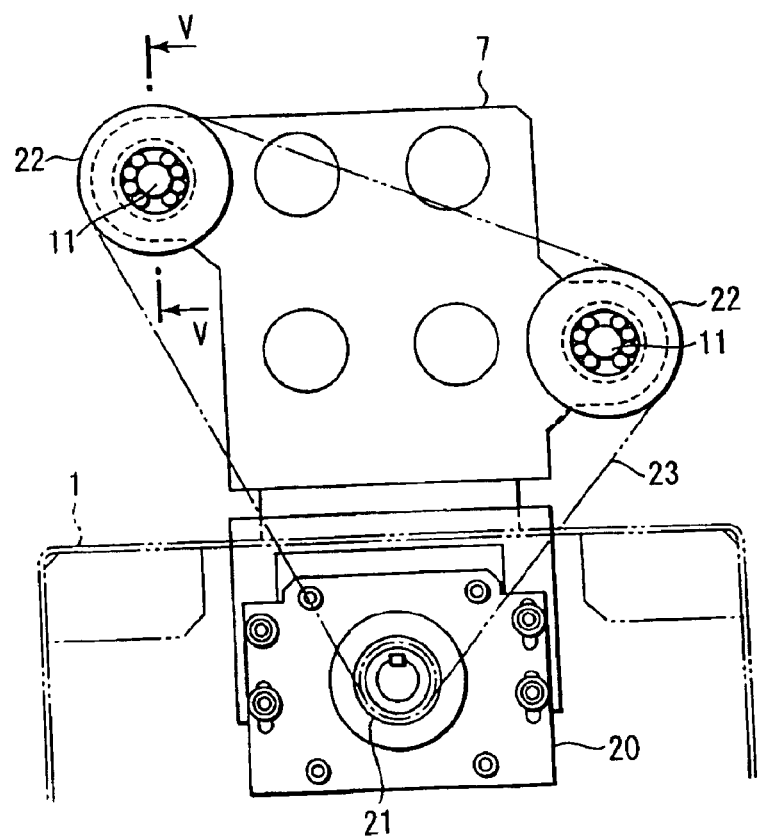
FIG. 4 is a detail view showing the connecting portion between the motor and the threaded rod.

FIG. 4 is a side view of the unit as viewed from the left, showing how to connect the motor 20 and the threaded rod 11. The pulley 22 is attached to the rear end portion of the threaded rod 11 of each of ball screws. On the other hand, the pulley 21 is attached to the shaft of the motor 20. A timing belt 23 goes around the pulleys 21 and 22.

Figure 5:
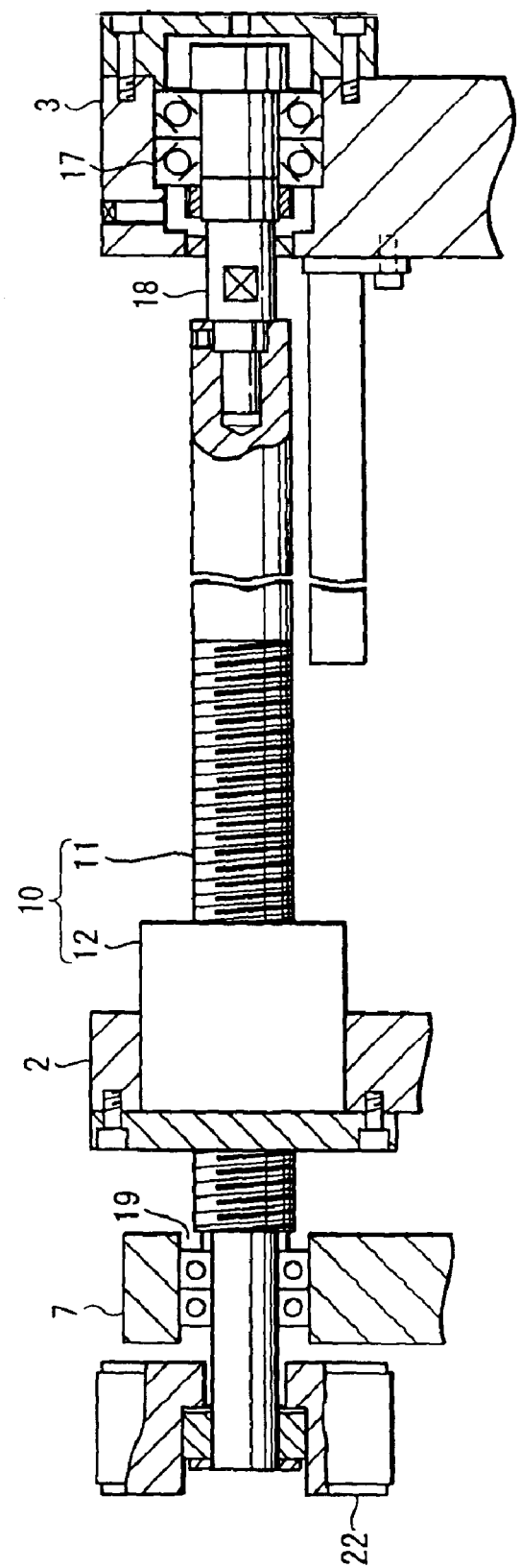
FIG. 5 is a sectional view showing the part of a ball screw, taken along the V—V line of FIG. 4.

FIG. 5 shows a fragmentary view of the ball screw 10, taken along the line V—V of FIG. 4. The nut 12 of the ball screw 10 is fixed on the backup plate 2. The threaded rod 11 of the ball screw 10 passes through the backup plate 2 via the nut 12. The tip portion (right end in the figure) of the threaded rod 11 of the ball screw 10 is rotatably connected to the front surface of the stationary platen 3 via a bearing 17 and a fixing member 18. The rear end portion (left end in the figure) of the threaded rod 11 is rotatably supported by the support plate 7 via a bearing 19 and passes trough the support plate 7. The pulley 22 is attached to the rear end portion of the threaded rod 11.

Now, the operation of the electric direct-acting die clamping unit of the present invention will be described with reference to FIGS. 1 and 2.

When the motor 20 moves the threaded rod 11, the nut 12 is moved along the threaded rod 11. Accordingly, the backup plate 2 moves back and forth along the threaded rod 11. Along with the movement of the backup plate 2, the movable platen 4 moves, which is connected to the front surface of the backup plate 2 by means of the coil spring 9. As mentioned above, the clamping and unclamping operation is performed by moving the ball screw 10.

When dies are clamped, a ball screw 10 is rotated to move the movable platen 4 toward the stationary platen 3. As a result, the stationary die 5 comes into contact with the movable die 6. At this time, the reactive force against to the clamping force (compressive stress applied to the die surfaces) is transmitted to the threaded rod 11 through the load cell 15, spring support member 8, coil spring 9, and backup plate 2. As a result, the threaded rod 11 is elastically stretched, whereas the coil spring 9 is contracted.

The spring constant of the coil spring 9 is appropriately set so as to permit the coil spring to contract relatively more than the threaded rod 11 stretches. By virtue of this, the die clamping force increases gently when the die surfaces are brought into contact with each other by clamping the dies. In this manner, the die clamping force can be controlled accurately. As a result, the overshoot of the clamping force can be prevented, thereby controlling the clamping force more accurately.

According to the electric direct-acting clamping unit of the injection molding machine of the present invention, the stationary platen and the backup plate are connected by means of a ball screw and the movable platen is connected to the front surface of the back plate via an elastic member. Therefore, the clamping force is increased gently when the die surfaces are brought into contact with each other by clamping the dies. In addition, the clamping force can be accurately controlled. As a result, the overshoot of the clamping force can be prevented, thereby controlling the clamping more accurately.

Furthermore, an excessive load cannot be applied on the parts of the die-clamping unit, and therefore, the life of the parts can be extended.

According to the electric direct-acting clamping unit of the injection-molding machine of the present invention, the threaded rod of the ball screw can also play the role of tie rods of a conventional machine. Therefore, the number of parts of the machine can be reduced, simplifying the structure of the machine.

Since a plurality of ball screws is used, the load applied by a clamping force can be distributed among them. Therefore, the sizes of the ball screws can be reduced.

Note that if the stationary platen and the back plate are connected by two ball screws, the number of rod members arranged between the stationary platen and the movable platen can be reduced. As a result, the operator can more easily get access to the dies, compared to a conventional machine.

Figure 6:
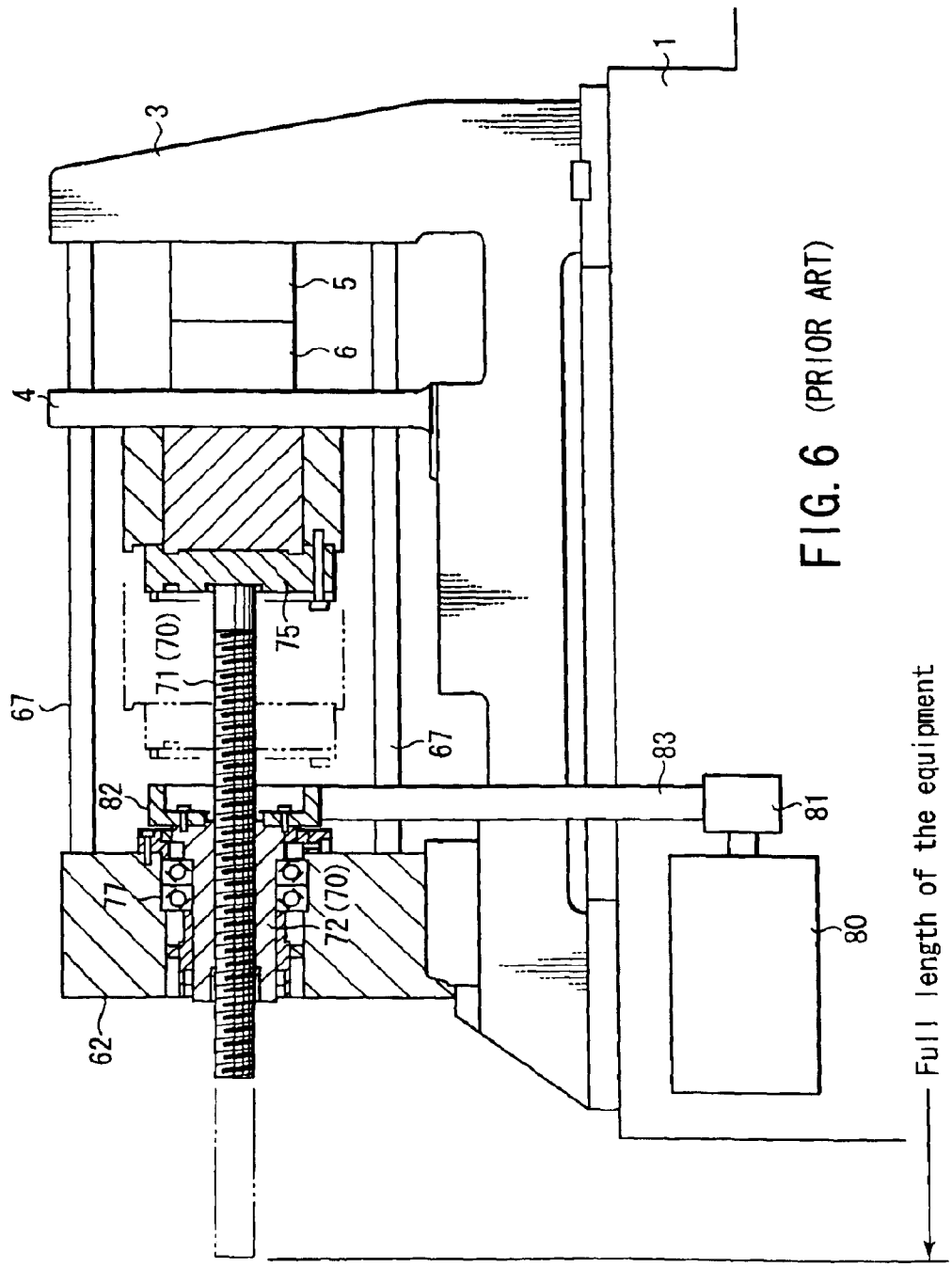
FIG. 6 is a view showing a schematic structure of a conventional electric direct-acting die clamping unit.

Unlike the threaded rod of the ball screw (represented by reference numeral 71 in FIG. 6) of the conventional machine (FIG. 6), the threaded rod of the present invention does not protrude from the back of the base (1). Hence, the entire length of the machine can be reduced.

What is claimed is:

1. An electric direct-acting die clamping unit of an injection molding machine, comprising:

a base;

a back plate fixed at one of the ends of the base;

a stationary platen fixed at the other end of the base and configured to hold a stationary die;

a movable platen configured to hold a movable die and arranged on the base such that a front surface of the movable platen faces the stationary platen;

a ball screw having a threaded rod and a nut, the tip of the threaded rod being fixed at a back surface of the movable platen;

a housing configured to rotatably support the nut;

an elastic member connecting between the back plate and the housing and contractable in the directions of clamping and unclamping the dies; and a motor rotating the nut of the ball screw.

2. An electric direct-acting clamping unit of an injection-molding machine according to claim 1, wherein said elastic member is a coil spring.

* * * * *